July 10, 1951 — H. J. STEGEMAN — 2,560,310
TAKE-UP DEVICE
Filed Dec. 21, 1949 — 2 Sheets-Sheet 1

INVENTOR.
HENRY J. STEGEMAN
BY
ATTORNEY

INVENTOR.
HENRY J. STEGEMAN
BY
ATTORNEY

Patented July 10, 1951

2,560,310

UNITED STATES PATENT OFFICE 2,560,310

TAKE-UP DEVICE

Henry J. Stegeman, Fairfield, Conn., assignor to The Locke Steel Chain Company, Bridgeport, Conn., a corporation of Connecticut Application December 21, 1949, Serial No. 134,173

14 Claims. (Cl. 74—242.11)

This invention relates to new and useful improvements in chain take-up devices and comprehends certain improvements in the take-up device disclosed in my U. S. Patent 2,044,719 granted June 16, 1936.

The objects and advantages of the invention will become apparent from a consideration of the following detailed description taken in connection with the accompanying drawings wherein a satisfactory embodiment of my invention is shown. However, it is to be understood that the invention is not limited to the details shown but includes all such variations and modifications as fall within the spirit of the invention and the scope of the appended claims.

Figure 1:
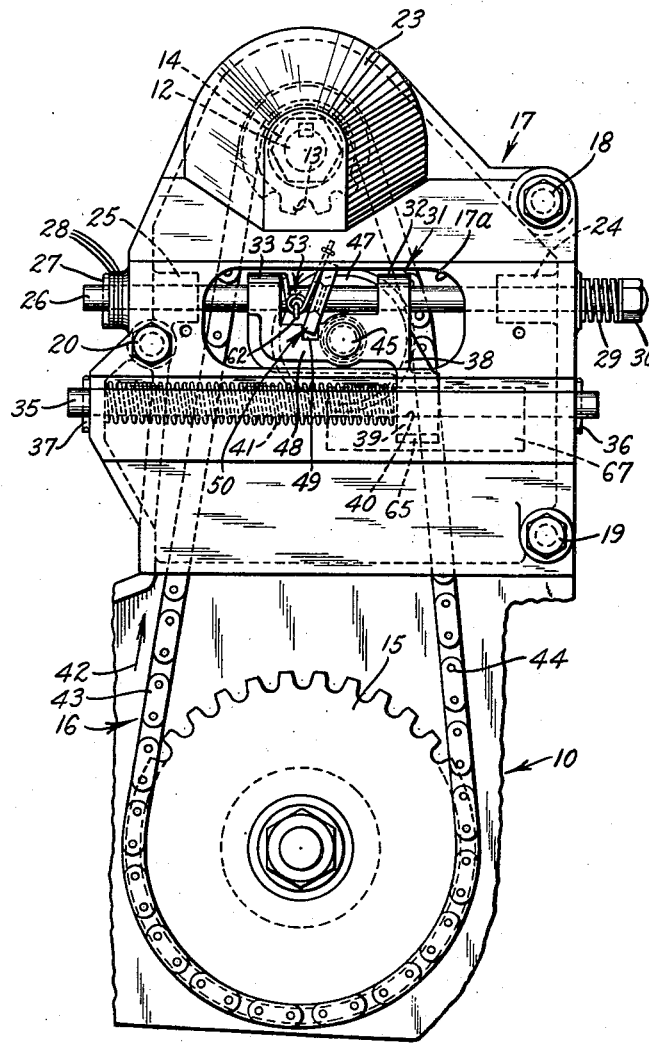
Fig. 1 is a front elevational view of a portion of a lawn mower having the take-up device of the invention incorporated therein.

The present take-up device may be applied to any type of flexible driving element, such as a belt or chain, to take up slack in such element. As the device is equally applicable to any such type of driving element, it is intended that in this specification and in the appended claims, wherever reference is made to a "chain," by the use of such word it is intended to cover belts and any other type of endless flexible driving element as well as chains.

The present take-up is an improvement on the take-up device disclosed in my Patent No. 2,044,719 issued June 16, 1936.

Referring in detail to the drawings, at 10 is shown a portion of a frame of a lawn mower or other machine or apparatus wherein an endless flexible driving element, such as a belt, chain or the like, is used. At one side of the upper portion of this frame 10 is a portion 11 of a housing or other means from which projects a shaft 12 mounting a sprocket 13. Shaft 12 is driven in any suitable manner, as through certain gearing (not shown) within the housing 11 and accordingly drives the sprocket 13 which may be held on the shaft as by a nut 14. Trained over the driving sprocket 13 and over a driven sprocket 15 is an endless flexible chain 16.

Secured to the frame 10 is a frame piece generally designated 17 and which is shown as located at the outer side of the sprocket 13 and at a portion of the outer side of the chain 16. This frame piece 17 is secured in place by three bolts or machine screws 17, 19 and 20, of which the screw 18 is relatively long to reach an inwardly offset portion 21 of the frame 10 and a collar 22 surrounds a portion of this long screw between the frame piece 17 and the offset 21 whereby the frame piece 17 is rigidly mounted. Frame piece 17 has a window or opening 17a therethrough and which, when the complete mower is assembled, is closed by a plate 17b secured in place as by short screws or the like 17c. The upper portion 23 of the frame piece is bevelled outwardly to provide suitable clearance for the nut 14 and adjacent portions of the sprocket 13.

Element 17 supports or has formed integral therewith a pair of opposed aligned bearings 24 and 25 in spaced relation. A bar 26 is supported in these bearings 24 and 25 and, in fact, extends entirely through them and as will be made clear, is mounted for limited longitudinal movement. A cotter pin or similar means 27 is passed through an end portion of the bar 26 at the outer side of the frame piece 17. This stop or cotter pin cannot pass through the bearing 25 and thus limits longitudinal movement of the bar toward the right, as the same is viewed in Fig. 1, and toward the left, as viewed in Fig. 4. Preferably, a number of washers 28 surround the bar between the cotter pin or limiting device 27 and the adjacent portion of the frame piece 17.

A compression spring 29 surrounds the other end portion of the bar 26 and is located at the outer side of the frame piece 17 and at the inner side of a nut 30 comprising a fixed head on said bar. This spring is regulated by the number of washers 28 employed. Clearly, this spring is constantly tending to shift the bar 26 toward the left as viewed in Fig. 4 and toward the right as the same is viewed in Fig. 1, but is limited in such tendency by the limiting device or stop 27.

Figure 6:
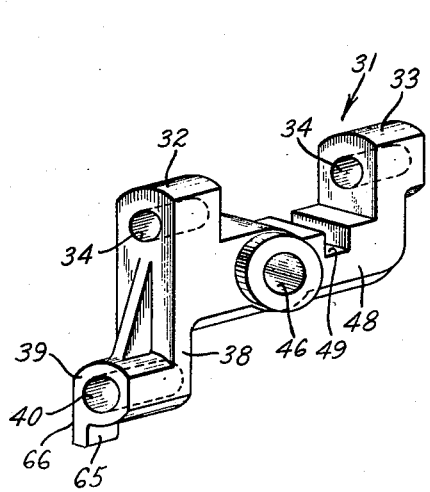
Fig. 6 is a perspective view of a slidable carrier comprising part of my improved take-up device.
Figure 7:
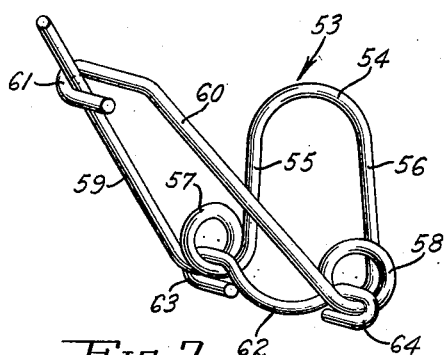
Fig. 7 is a similar view of a spring employed in such device.

Slidably mounted on the intermediate portion of the bar 26 is a carrier generally designated 31 and shown alone in Fig. 6. This carrier includes a pair of spaced bearing portions 32 and 33 having aligned holes 34 therethrough and through which the bar 26 passes whereby the carrier is mounted on the bar for movement along the bar.

Also mounted on the frame piece 17 is a rod 35, the same being held against longitudinal movement by a pair of stop devices 36 and 37, comprising cotter pins, passing through the end portions of the rod at the outer sides of the frame piece 17. This rod is located in spaced but substantially parallel relation with the bar 26. Carrier 31 includes a rigid extension 38 shown as comprising an integral part of the carrier and supporting an eye piece or portion 39, the opening 40 of which is parallel with the openings 34 through the bearings 32 and 33. This eye 39 receives the rod 35 and the opening 40 of the eye is of such diameter as to have a neat but sliding fit along the rod.

About the rod 35 at one side of the extension 38 and bearing at one end against the eye portion 39 of the latter is a relatively long coil spring 41. At its opposite end, such spring bears against a portion of the frame piece 17. With this construction, it will be clear that the coil spring 41 presses against the eye 39 and the latter being rigid with or part of the rigid extension 38 of the carrier 31, as the spring tends to slide the eye 39 along the rod 35, the spring also acts to slide the entire carrier 31 along the bar 26.

It has been heretofore noted that the frame piece 17 is at one side of the chain 16. For the present purpose, it will be considered that chain 16 is being driven in the direction indicated by the arrow 42 whereby the chain comprises a tight side or flight 43 and a slack side or flight 44. A stud 45 mounted as in a bearing opening 46 in the carrier 31 rotatably mounts a roller 47.

Clearly, with this arrangement, roller 47 is mounted for turning or rotation relative to the carrier 31 but is also mounted for bodily movement with the carrier as the latter has movement along bar 26 relative to the frame piece 17. As herein disclosed, the roller 47 is located at one side of the carrier 31 and is actually located between the flights 43 and 44 of the chain 16 and in the plane of such chain whereby on movement of the carrier 31 along the bar 26 under the urging of the spring 41, such roller 47 is maintained against the slack flight 44 of the chain.

In the upper side of its body portion 48 and between its bearing portions 32 and 33, the carrier 31 is provided with a notch or recess or transverse groove 49. Mounted on the bar 26 between the carrier bearings 32 and 33 is a locking dog 50 shown as a rigid rectangular plate-like member of a size or length to have its lower portion 51 enter notch or channel 49. This locking dog will be a hardened steel piece and has an opening 52 therethrough of such diameter that on the dog being normal to the longitudinal axis of the bar 26, the dog is slidable along the bar in either direction.

Figure 3:
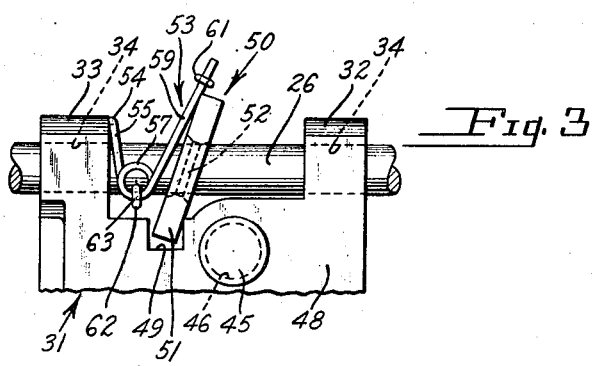
Fig. 3 is a detail elevational view on an enlarged scale and showing details of construction.
Figure 4:
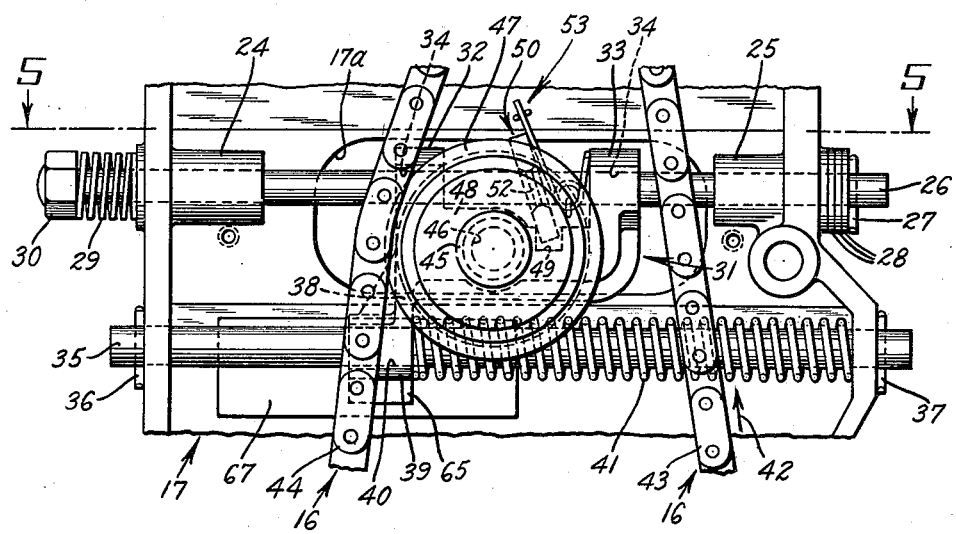
Fig. 4 is a rear elevational view, on an enlarged scale, of the take-up device of Fig. 1.
Figure 5:
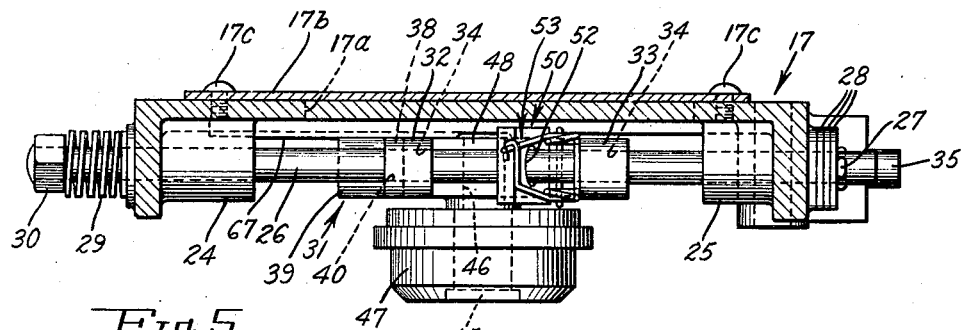
Fig. 5 is a sectional view taken as along the plane of the line 5—5 of Fig. 4.

However, a spring generally designated 53 normally biases the dog as to the position of Figs. 1, 3 and 4 in which position of the dog the carrier 31 may slide along the bar 26 in a direction to move the roller 47 against the flight 44 of the chain. However, on any attempt to move the carrier in the opposite direction, the dog 50 binds or bites on the bar preventing movement of the carrier in the opposite direction along the bar or in a direction to shift the roller 47 away from the flight 44 of the chain.

The spring 53 comprises a piece of spring wire bent intermediate its ends into a loop or bight portion 54 from which extend side arms 55 and 56. The stock of the spring at the inner ends of these arms 55 and 56 is coiled upon itself to provide coils or eyes 57 and 58, respectively, and then the stock is carried upwardly providing arms 59 and 60. Of these, the arm 60 has its outer end portion bent laterally to provide a hook 61 hooked about the free extending portion of the arm 59. This is to prevent lateral spreading of the arms. A tie-member 62 extends between the eyes or coils 57 and 58 and has bent-in portions 63 and 64 connecting it to such eye portions or coils.

Spring 53 is mounted in such manner that the rod 26 passes between its arms 55 and 56 and below its bight portion 54 and above the connecting piece or tie-member 62. This also locates the arms 59 and 60 at the respective opposite sides of the bar. Then the loop portion of the spring including the bight portion 54 is disposed against the inner side of one of the bearings of the carrier, as for example, the bearing 33, and the arms 59 and 60 of the spring press against the inner or adjacent side of the locking dog 50. This serves to keep said dog biased or in biased position. The bight portion 54 of the spring and the tie-member 62 prevent movement of the spring upwardly or downwardly out of position since these portions, in cooperation with the bar 26, limit any such movements of the spring.

When the present assembly is initially made, the carrier 31 may be slid back along the bar 26 when the locking dog 50 is held normal to such bar to have the roller 47 locate between the flights of the chain. Then the carrier is released and the spring 41 shifts the same along the bar 26 to bring the roller against the slack side or slack flight 44 of the chain. The spring 41 presses the roller against such flight of the chain taking up the slack therein.

Then as the chain elongates in use, due to wear or slight stretching, the spring 41 continues its function of shifting the carrier along the bar and maintaining the roller in engagement with the slack flight of the chain to keep the slack therefrom so that the chain will not fall off the sprocket 15 or otherwise fail to function in its proper manner. Ultimately the chain may wear or stretch and elongate to such proportions that the present take-up device will have reached the limit of its movement and yet the chain will not be functioning properly. In such an instance, a link or even two links may be removed from the chain and then the carrier reset back to its initial position on the bar 26.

Under certain circumstances, an excessive load may be placed on the chain resulting in a severe thrust against the roller in a direction tending to move it and the carrier backward or in the opposite direction to that in which it is urged by the spring 41. This may occur on reversing of the chain or the like, it being noted that the housing 11 may house a reversing gearing.

The locking dog 50 secures the carrier to the shaft against any movement thereon in the direction indicated. Therefore, under the circumstances of an excessive load on the chain and an excessive thrust on the roller, the spring 29 permits of longitudinal movement of the bar 26 in the direction necessary to provide for this reverse movement of the roller or for movement of the roller in the direction opposite to that in which it is urged by the spring 41. Thus, it will be understood that normally the spring 29 is tending to move the bar 26 in the same direction as that in which the spring 41 is tending to move the carrier 31 and the roller 47. This tendency of the spring 49 is limited by the stop or cotter pin 27.

When for any reason, however, an excessive load is applied to the tight side 43 of the chain, the elasticity of the chain, shafts, bearings and other parts will permit an excess of slack on the side 44 of the chain. Such excessive slack permits the roller 47 and parts associated therewith to move towards the right in Fig. 1 or towards the left in Fig. 4, the carrier 31 and locking dog 50 sliding along the bar 26 which is held against such movement by engagement of the cotter pin 27 with the washers 28. When such excessive load is removed, then the elasticity of the various parts will tend to cause them to return to their normal positions, including a return of the side 44 of the chain to its normal position.

This return of the side 44 of the chain is resisted by the roller 47 which is locked in position by the locking dog 50 on the bar 26. To permit the chain to be restored to its normal position, the bar 26 may slide longitudinally (as toward the left in Fig. 1) and the spring 29 is weak enough to permit of this movement. However, the coils of the spring 29 will come in contact with each other and will form a positive stop by the time the side 44 of the chain has reached its normal position, such as that shown. As another excessive load is applied to chain side 43, the bar 26 may move to the right (Fig. 1) until the cotter pin 27 engages the washers 28, and as succeeding excessive loads are applied and released the bar may move back and forth as described. The spring 29 normally will move the bar before the carrier will slide along the bar, and, until the cotter pin 27 strikes the washers 28, all natural wear will be taken up by the action of the spring 29.

Preferably, this spring 29, here shown as a flat coil spring, is of such kind as to exert a substantial uniform action throughout its compression, as nearly as that can be done by any spring, and the length of the spring is such that the difference between its free length and its compressed length will correspond to the difference between normal position and maximum loaded position of the chain.

In case of a reversal of the direction of movement of the chain so that the side 44 thereof becomes the driving or tight side, the coils of the spring 29 likewise come together and act as a positive stop to limit excessive movement of the rod 26 as to the left in Fig. 1. Excessive movement in the direction indicated would create an excessive slack in the side 43 of the chain which is not provided with a take-up roller.

The above arrangement has a material advantage over one in which a single spring, such as the spring 41, is used because if such a spring were relied upon to perform the same action as that for which spring 29 is used, there would be a continual flutter of the roller 47, which would be undesirable and moreover the spring 41 would have to be so strong that it would tend to cause binding of the chain on the sprockets. By the arrangement described above, however, the spring 41 may be used merely to follow up the wear on the chain.

The carrier 31 being mounted on the bar 26 and the rod 35, such carrier is held against all but a straight line movement in the direction of the length of such bar and rod. Together, the bar and rod provide a means preventing tipping or tilting of the carrier or any such movement thereof as would dispose the roller 47 in an inclined relation, or in any other improper relation to the chain. The bar and rod together provide ample strength to resist tipping or tilting or cocking of the carrier and in addition they are of such strength as to not become bent or twisted in their own common plane as excessive pressures are impressed on the roller by the chain during its use.

In addition to the mounting of the carrier on the bar and rod, there are other means on the frame for preventing substantial movement of the carrier in any direction about the bar and thus to prevent tilting of the roller 47 out of its proper plane. For this purpose, the eye portion 39 of the extension 38 of the carrier 31 is provided with a lip 65, the rear side of which is flat and flush with the rear side of the eye 39 as at 66 (Fig. 6). Frame piece 17 is formed with a pad 67 which is carefully machined to the proper height and the side 66 of the eye 39 and lip 65 rides along parallel and in close relation with the machined side of this pad. In fact, it may have sliding contact therewith.

Figure 2:
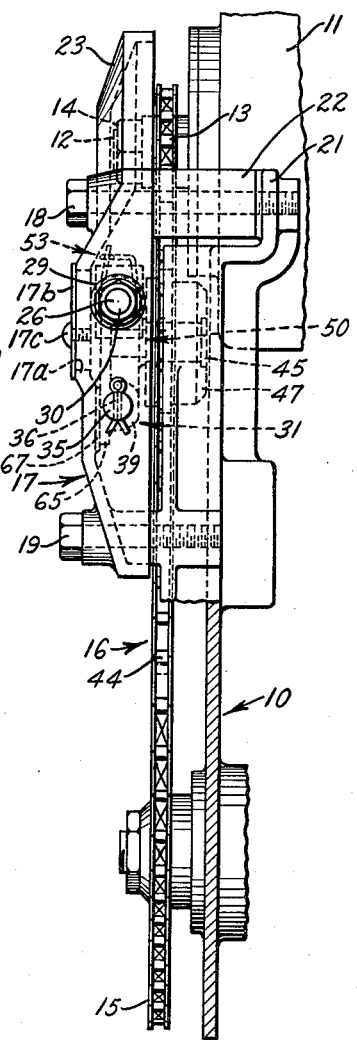
Fig. 2 is an edge elevational view thereof, the view being taken as looking from the right in Fig. 1.

With such a construction it will be apparent that on any tendency of the carrier to tilt out of a straight path of movement, side 66 will be against pad 67 and the tilting tendency will be checked. Furthermore, any such tilting movement of the carrier will tilt the roller 47. Any substantial tilting of the roller is also prevented by the adjacent wall of frame 10. Thus, in Fig. 2, it will be apparent that the roller just clears this wall and moves parallel with it. Should the roller tilt out of its proper plane, it will come into engagement with the wall and any substantial tilting of the roller out of its proper plane will be prevented.

Having thus set forth the nature of my invention, what I claim is:

1. A slack take-up device for a chain comprising a roller adapted to engage the slack side of a chain, a fixed frame piece, a bar mounted by said frame piece at one side of said roller and having limited longitudinal sliding movement relative to said frame piece, a carrier slidable on said bar and at one side mounting said roller, a spring acting on said carrier to move it in one direction along said bar and maintain said roller in engagement with the slack side of said chain, means locking said carrier to said bar against movement therealong in the opposite direction, an auxiliary compression spring acting on said bar in the same direction as the first mentioned spring acts on said carrier and thereby also tending to hold said roller in engagement with the slack side of said chain, and a stop limiting expansion of said auxiliary spring.

2. A slack take-up device for a chain comprising a roller adapted to engage the slack side of a chain, a bar extending transversely to the direction of movement of said slack side of the chain, a carrier slidable along said bar and mounting said roller, a locking dog mounted on said carrier and engageable with said bar to prevent movement of the carrier therealong in a direction to carry the roller away from the slack side of the chain while permitting of movement of the carrier along the bar to have the roller follow the chain as it wears, means supporting said bar for lengthwise sliding movement, means limiting movement of said bar in the direction of movement of the carrier and roller as the latter takes up slack in said chain, and a spring yieldingly resisting movement of the bar in the opposite direction from reaction to excessive loads on the chain resulting in a thrust on the roller and thereby on the carriage in a direction to move the latter in said opposite direction.

3. A slack take-up device comprising a roller adapted to engage the slack side of a chain, a bar at one side of said chain and extending transversely of the path of movement of the latter, a carrier slidable on said bar, a roller mounted on said carrier at one side thereof and located between the flights of said chain, said roller movable with said carrier toward and away from a flight of said chain as said carrier moves along said bar, a spring urging said carrier along said bar toward said chain flight to hold said roller in engagement with said chain flight, a lock preventing movement of said carrier and thus said roller along said bar in a direction away from the chain flight, and an auxiliary spring acting upon the bar and thus said roller through said lock to likewise urge the roller toward said chain flight.

4. In a slack take-up device for a chain, a fixed rigid frame piece at one side of a chain, a bar supported toward its ends by said frame piece for limited longitudinal movement relative to said frame piece, a rod supported toward its ends by said frame piece and located in substantially parallel relation to said bar, a carrier including a pair of spaced bearing members through which the intermediate portion of said bar passes and by which said carrier is mounted for sliding movement longitudinally of said bar, an integral extension on said carrier, said extension having an opening therethrough and through which the intermediate portion of said rod passes whereby as the carrier slides on the bar said extension slides along said rod and sliding movement of the carrier is limited to a straight line movement, a roller mounted on said carrier for rotation relative thereto and for bodily movement therewith and in a plane for engagement with the slack side of said chain on movement of the carrier in one direction along said bar, a relatively long coil spring about said rod and bearing at one end against said extension of said carrier and normally urging the extension and thereby said carrier in one direction to force said roller against said slack side of the chain, a locking dog on said bar between the bearings of said carrier and having a portion entering a notch in the body of said carrier, said dog adapted to lock said carrier to said bar against movement therealong in the opposite direction to carry the roller from the slack side of the chain, means limiting longitudinal movement of said bar in the direction of movement of said carrier by said spring, and an auxiliary spring on said bar and normally urging it in said direction and providing for limited movement of the bar and thus the carrier and roller in the opposite direction on an excessive load on said chain resulting in a thrust on the roller in a direction to move the latter in said opposite direction.

5. In a slack take-up device for a chain, a fixed rigid frame piece at one side of a chain, a bar supported by said frame piece for limited longitudinal movement relative thereto, a rod supported by said frame piece in substantially parallel relation with said bar, a carrier mounted on said bar for sliding movement longitudinally thereof, an extension rigid with said carrier and having sliding guided engagement with said rod whereby movement of the carrier is limited to a straight line movement along said bar, a roller mounted on said carrier for rotation relative thereto and for bodily movement therewith and in a plane for engagement with the slack side of the chain on movement of the carrier in one direction along the bar, and a relatively long coil spring about said rod and bearing at one end against said extension and normally urging the latter and thereby said carrier in one direction to press said roller against said slack side of the chain.

6. In a slack take-up device for a chain, a fixed rigid frame piece at one side of a chain, a bar supported by said frame piece for limited longitudinal movement relative thereto, a rod supported by said frame piece in substantially parallel relation with said bar, a carrier mounted on said bar for sliding movement longitudinally thereof, an extension rigid with said carrier and having sliding guided engagement with said rod whereby movement of the carrier is limited to a straight line movement along said bar, a roller mounted on said carrier for rotation relative thereto and for bodily movement therewith and in a plane for engagement with the slack side of the chain on movement of the carrier in one direction along the bar, a relatively long coil spring about said rod and bearing at one end against said carrier and normally urging the latter in one direction to press said roller against said slack side of the chain, means for locking said carrier to said bar against movement therealong in the opposite direction, and an auxiliary spring normally urging said bar in the direction to press said roller against the slack side of the chain and providing for limited movement of the bar and thus the carrier and roller in the opposite direction on an excessive load on said chain resulting in a thrust on the roller in a direction to move the latter in said opposite direction.

7. In a slack take-up for a chain, a fixed rigid frame piece at one side of a chain, a bar supported by said frame piece, a rod supported by said frame piece in substantially parallel relation with said bar, a carrier mounted on said bar for sliding movement longitudinally thereof, an extension rigid with said carrier and having sliding guided engagement with said rod whereby movement of the carrier along said bar is limited to a straight line movement, a roller, means mounting said roller on said carrier for rotation relative thereto and for bodily movement therewith, said roller located between the flights of said chain in a plane for engagement with the inside of the slack flight thereof on movement of the carrier in one direction along said bar, and spring means normally urging said carrier in said direction along said bar to maintain said roller against the slack flight of said chain as the latter wears.

8. In a slack take-up for a chain, a fixed rigid frame piece at one side of a chain, a bar supported by said frame piece, a rod supported by said frame piece in substantially parallel relation with said bar, a carrier mounted on said bar and rod for sliding movement longitudinally thereof whereby movement of the carrier is along said bar limited to a straight line movement, a roller, means mounting said roller on said carrier for rotation relative thereto and for bodily movement therewith, said roller located for engagement with the slack flight of said chain on movement of the carrier in one direction along the bar and rod, and spring means normally urging said carrier in said direction along the bar and rod to maintain said roller against the slack flight of the chain as the latter wears.

9. In a slack take-up for a chain, a fixed rigid frame piece at one side of a chain, a bar supported by said frame piece, a rod supported by said frame piece in substantially parallel relation with said bar, a carrier mounted on said bar for sliding movement longitudinally thereof, an extension rigid with said carrier and having sliding guided engagement with said rod whereby movement of the carrier is along said bar limited to a straight line movement, a roller, means mounting said roller on said carrier for rotation relative thereto and for bodily movement therewith, said roller located for engagement with the slack flight of said chain on movement of the carrier in one direction along the bar, spring means normally urging said carrier in said direction along the bar to maintain said roller against the slack flight of the chain as the latter wears, means for locking said carrier to said bar against movement therealong in a direction to carry said roller away from the slack flight of the chain, said bar mounted for limited longitudinal movement on said frame piece, and an auxiliary spring normally urging said bar in the direction to press said roller against the slack flight of the chain and providing for limited movement of the bar and thus the carrier and roller in said opposite direction on an excessive load on said chain resulting in a thrust on the roller in a direction to move the latter in said opposite direction.

10. In a slack take-up device for a chain, a fixed rigid frame piece at one side of a chain, a bar supported by said frame piece for limited longitudinal movement relative thereto, a rod supported by said frame piece in substantially parallel relation with said bar, a carrier mounted on said bar for sliding movement longitudinally thereof, an extension rigid with said carrier and having sliding guided engagement with said rod whereby movement of the carrier is limited to a straight line movement along said bar, a roller mounted on said carrier for rotation relative thereto and for bodily movement therewith and in a plane for engagement with the slack side of the chain on movement of the carrier in one direction along the bar, and a spring means normally urging said carrier in said direction along the bar to maintain said roller against the slack flight of the chain as the latter wears.

11. In a slack take-up device for a chain, a fixed rigid frame piece at one side of a chain, a bar supported by said frame piece for limited longitudinal movement relative thereto, a rod supported by said frame piece in substantially parallel relation with said bar, a carrier mounted on said bar for sliding movement longitudinally thereof, an extension rigid with said carrier and including an eye encircling and slidable along said rod whereby movement of the carrier is limited to a straight line movement along said bar, a roller mounted on said carrier for rotation relative thereto and for bodily movement therewith and in a plane for engagement with the slack side of the chain on movement of the carrier in one direction along the bar, and a relatively long coil spring about said rod and bearing at one end against said extension and normally urging the latter and thereby said carrier in one direction to press said roller against said slack side of the chain.

12. A slack take-up device for a chain comprising a roller adapted to engage the side of a slack chain, a fixed frame, a bar mounted in said frame at one side of said roller, a carrier slidable on said bar and at one side mounting said roller, a spring acting on said carrier to move it in one direction along said bar and maintain said roller in engagement with said chain to take up the slack therein, and means locking said carrier to said bar against movement therealong in the opposite direction.

13. A slack take-up device for a chain comprising a roller adapted to engage the side of a slack chain, a fixed frame, a bar mounted in said frame at one side of said roller, a carrier slidable on said bar and at one side mounting said roller, a spring acting on said carrier to move it in one direction along said bar and maintain said roller in engagement with said chain to take up the slack therein, and means locking said carrier to said bar against movement therealong in the opposite direction, and means on said frame and substantially preventing movement of said carrier in any direction about said bar.

14. In a slack take-up for a chain, a fixed rigid frame piece at one side of a chain, a bar supported by said frame piece, a rod supported by said frame piece in substantially parallel relation with said bar, a carrier mounted on said bar and rod for sliding movement longitudinally thereof whereby movement of the carrier is along said bar limited to a straight line movement, a roller, means mounting said roller on said carrier for rotation relative thereto and for bodily movement therewith, said roller located for engagement with the slack flight of said chain on movement of the carrier in one direction along the bar and rod, spring means normally urging said carrier in said direction along the bar and rod to maintain said roller against the slack flight of the chain as the latter wears, and said frame including portions for cooperation directly with said roller and carrier for maintaining the former against substantial movement out of a fixed plane.

HENRY J. STEGEMAN.

REFERENCES CITED

The following references are of record in the file of this patent:

UNITED STATES PATENTS

| Number | Name | Date |
| --- | --- | --- |
| 683,968 | Moskowitz | Oct. 8, 1901 |
| 1,022,756 | Rice | Apr. 9, 1912 |
| 1,832,958 | Backle | Nov. 24, 1931 |